United States Patent [19]

Duh

[11] 4,205,157

[45] May 27, 1980

[54] METHOD FOR PRODUCTION OF HIGH MOLECULAR WEIGHT POLYESTER WITH LOW CATALYST LEVEL AND LOW CARBOXYL CONTENT

[75] Inventor: Ben Duh, Tallmadge, Ohio

[73] Assignee: The Goodyear Tire & Rubber Company, Akron, Ohio

[21] Appl. No.: 25,697

[22] Filed: Apr. 2, 1979

[51] Int. Cl.$^2$ .................... C08G 63/18; C08G 63/36
[52] U.S. Cl. .................... 528/272; 528/279; 528/280; 528/281; 528/283; 528/284; 528/285; 525/437
[58] Field of Search ............... 528/272, 273, 279, 280, 528/281, 283, 284, 285, 302, 309, 483

[56] References Cited

U.S. PATENT DOCUMENTS

| | | | |
|---|---|---|---|
| 3,644,291 | 2/1972 | Price et al. | 528/279 |
| 3,732,182 | 5/1973 | Chimura et al. | 528/279 X |
| 3,842,041 | 10/1974 | Browne et al. | 528/279 |
| 3,859,257 | 1/1975 | Schade et al. | 528/279 X |
| 4,080,317 | 3/1978 | Morawetz et al. | 528/283 X |
| 4,133,800 | 1/1979 | Taubinger et al. | 528/283 X |

Primary Examiner—Lucille M. Phynes
Attorney, Agent, or Firm—Oldham, Oldham, Hudak & Weber

[57] ABSTRACT

A high molecular weight polyester is disclosed, having a low carboxyl content, and utilizing a low catalyst level, produced by a two-stage process; a melt process until the intrinsic viscosity of the prepolymer reaches about between 0.15 and 0.45 dl/g, and a solid state polymerization in a fluidized bed until the intrinsic viscosity of the polycondensed polymer reaches at least 0.60 dl/g. The melt process employs addition of excess initial glycol, delayed addition of excess glycol, and delayed addition of catalyst, in any combination, to achieve a low carboxyl content polyester prepolymer capable of use in the fluidized bed solid state polymerization. This prepolymer with a minimal carboxyl content achieves a maximum solid state polymerization rate in a fluidized bed. This prepolymer also permits the use of a very low catalyst level to achieve high product purity and still maintains economically satisfactory polymerization rate. Stability and color clarity of the polycondensed product is obtained by this method.

44 Claims, No Drawings

METHOD FOR PRODUCTION OF HIGH MOLECULAR WEIGHT POLYESTER WITH LOW CATALYST LEVEL AND LOW CARBOXYL CONTENT

BACKGROUND OF THE INVENTION

The present invention relates to the production of polyesters having a high molecular weight and high chemical purity.

Heretofore, polyesters have been produced by a variety of processes, many of which have failed to achieve a high molecular weight with high purity composition. Specifically, the use of the conventional melt process requires relatively high levels of catalysts (e.g., between 300-650 ppm of $SbO_3$ or greater than 10 ppm of Ti), to promote the polycondensation reaction within acceptable reaction times. The polyesters produced by the melt process usually contain more than 20 percent of the end groups having a carboxyl end group. Relatively high levels of catalyst and carboxyl end group content in polyethylene terephthalate produced by a conventional method contribute to chemical instability during processing and use. Therefore, stabilizers are usually added to improve the stability. For example, organic phosphorus is added to complex the catalyst and carboxiimide or epoxide is added to reduce the carboxyl end group content, the amounts of stabilizers required being proportional to the levels of catalyst and carboxyl end group contents in the polyester. Often, the additives are either not suitable for the particular commercial application, or are subject to government regulatory standards which inhibit their use. Even after the addition of the stabilizers, certain deleterious polymerization byproducts such as acetaldehydes present in the polyester reduce its purity, limiting the commercial applications of the polyester. The need for a high purity polyester composition presently exists in many commercial and industrial applications.

The production of polyesters by a melt process has been the conventional production method. However, the production of a polyester by conventional production methods requires the high levels of catalyst and yields significant carboxyl end group content, which is often a detriment to certain commercial and industrial applications mentioned above.

OBJECTS OF THE INVENTION

Therefore, it is an object of the invention to provide a method for the production of a high molecular weight, high purity polyester wherein the molecular weight of the polyester exceeds 0.6 dl/g intrinsic viscosity.

Another object of the invention is to provide a method for the production of a high molecular weight, high purity polyester, as above, having a minimal percentage of carboxyl end group content throughout the reaction process.

A further object of the invention is to provide a method for the production of a high molecular weight, high purity polyester, as above, utilizing a polyester production process which promotes the production of said polyester without the need for relatively high levels of catalysts.

An additional object of the invention is to provide a method for the production of a high molecular weight, high purity polyester, as above, which utilizes the melt process to a partial extent and then utilizes a solid state polymerization process in a fluidized bed to complete the polycondensation of the polyester.

Still another object of the invention is to provide a prepolymer polyester having a minimal carboxyl end group content and minimal concentration of catalyst.

Still a further object of the invention is to provide a polycondensed polyester which is produced by a melt process in conjunction with a solid state polymerization in a fluidized bed.

Yet another object of the invention is to provide a polycondensed polyester having minimal concentrations of impurities and minimal stability additives.

Still an additional object of the invention is to provide a method for the production of a high molecular weight, high purity polyester wherein the minimal carboxyl end group content in the prepolymer polyester maximizes the reaction rate for the solid state polymerization of the polycondensed polyester in the fluidized bed.

These and other objects of the present invention will become more apparent by the reference being given to the preferred embodiments of the invention described in detail hereinbelow. However, the invention may be summarized in the following manner. In general, the objects of the invention are achieved by the method for the production of a high molecular weight, high purity polyester comprising the steps of reacting a glycol and a dicarboxylic acid to form a polyester prepolymer, said polyester prepolymer having an intrinsic viscosity from about 0.15 dl/g to about 0.45 dl/g and having less than 20% carboxyl end group content, said dicarboxylic acids selected from the class consisting of alkyl dicarboxylic acids having a total of from 2 to 16 carbon atoms, and aryl dicarboxylic acids containing a total of from 8 to about 16 carbon atoms, said glycol selected from the class consisting of glycols having from 2 to 10 carbon atoms; and, polymerizing in a solid state in a fluidized bed, said polyester prepolymer so that a high molecular weight high purity polycondensed polyester is formed, said polycondensed polyester having an intrinsic viscosity at least 0.60 dl/g and having less than 20% carboxyl end group content.

PREFERRED EMBODIMENTS OF THE INVENTION

Polyester prepolymers normally contain carboxyl and hydroxyalkyl end groups. Whenever a polyester prepolymer having a carboxyl end group reacts with a polyester prepolymer having a hydroxyalkyl end group, the condensation reaction produces a polyester of a higher molecular weight with the by-product of water. The condensation polymerization reaction of these two prepolymers, to form a larger polyester, utilizes the esterification reaction mechanism.

Whenever a polyester prepolymer with a hydroxyalkyl end group reacts with a polyester prepolymer also having a hydroxyalkyl end group, the condensation reaction produces a polyester with a higher molecular weight and a glycol whose alkyl component is the same as the alkyl component in one of the hydroxyalkyl end groups of the smaller polyester reagent. This condensation polymerization reaction utilizes a transesterification reaction mechanism.

The transesterification reaction mechanism and the esterification reaction mechanism both have reversible kinetic properties. Therefore, as the polyester chain increases in the polycondensation reactions, the byproducts of water and glycols must be removed from the esterification reaction and the transesterification reaction, respectively.

It has been found that polyesters of at least 0.60 dl/g intrinsic viscosity, produced by the melt process alone, most likely contain higher than the 20% carboxyl end groups and require high levels of catalysts to maintain an acceptable reaction rate. Both high carboxyl and catalyst contents contribute to poor stability and poor color in the final polyester product. Also, high molecular weight polyesters produced by melt process alone contain a high concentration of acetaldehyde and are not suitable for beverage bottle applications.

According to the concepts of the present invention, it has been found that a solid state polymerization at elevated temperatures following a partial melt process unexpectedly permits the production of a polyester having a low carboxyl end group and catalyst content in the final product. This minimizes the need for any additives to stabilize the product or improve its color. Polyesters produced by the partial melt process - solid state polymerization of the present invention will become suitable for food, medical or beverage packaging applications as well as textile, tire, and other industrial and commercial applications.

The solid state polymerization of the polyester prepolymers may be carried out in a static or fluidized bed. The fluidized bed solid state polymerization has been found to be much more efficient than static solid state polymerization and is, therefore, the preferred method for the production of a low carboxyl polyester having minimal concentrations of catalysts, i.e., below 200 ppm of antimony and below 5 ppm of titanium. In addition to antimony and titanium, catalysts to be used in minimal concentrations include iron, zinc, cobalt, lead, manganese, niobium, and germanium.

Other advantages exist for the use of the solid state polymerization process, as a partial replacement of the melt process to achieve a high intrinsic viscosity polyester. Crystallizable polyester or copolyester prepolymers can be further polymerized in solid phase at temperatures of 5° to 40° C. below their melting points. The increase in the molecular weight or intrinsic viscosity of the polyester is caused by the esterification and transesterification reaction mechanisms described hereinabove. The effect of the lower temperature in the solid state polymerization process suppresses pyrolysis and other undesirable side reactions which discolor the final polyester product and reduce its stability.

In addition to the superior physical and chemical properties of the polycondensed polyester, the use of solid state polymerization in a fluidized bed has a reaction rate which is maximized when there is minimal carboxyl end group and catalyst content in the prepolymers or reagents for the polycondensation polymerization process. Therefore, the fluidized bed solid state polymerization rate increases with decreasing carboxyl content of the prepolymer. A prepolymer with very low carboxyl content requires a small amount of catalyst to maintain the maximum solid state reaction rate. To the contrary, a prepolymer with a high carboxyl content requires a larger amount of catalyst to obtain the maximum solid state polymerization rate. Therefore, to achieve the objects of the invention as described above, the solid state polymerization process in a fluidized bed must utilize prepolymers having minimal carboxyl end group, e.g., below 20% of total end group, and catalyst contents, as produced by the melt process system.

The melt process, as adapted to achieve the objects of the invention, is utilized only to obtain prepolymers having an intrinsic viscosity between about 0.15 and 0.45 dl/g. It is extremely difficult to obtain the required low carboxyl content prepolymers of an intrinsic viscosity lower than 0.15 dl/g because the prepolymerization reaches that level before many carboxyl groups have had sufficient time to react. Additionally, the reaction in the subsequent solid state polymerization process becomes too long to be economically feasible. On the other hand, it is likewise difficult to obtain this prepolymer with intrinsic viscosity greater than 0.45 dl/g because the melt becomes too viscous to stir without raising the temperature above 280° C. Prolonged exposure of the prepolymer to these high temperatures will cause the pyrolysis reactions which produce the undesirable carboxyl end groups for the final product.

Another reason for the upper intrinsic viscosity limit for the melt process prepared prepolymer is the preparation of prepolymer particles for the subsequent fluidized bed solid state polymerization. There are two types of methods to prepare the prepolymer particles. The first method is flaking followed by grinding. The energy consumed in grinding the prepolymer becomes economically unacceptable if the prepolymer intrinsic viscosity exceeds 0.45 dl/g. The other method is spray-congealing. The state of art of spray-congealing does not permit formation of powder of polyester prepolymer with an intrinsic viscosity of higher than 0.45 dl/g.

A variety of modifications to the melt process, used either alone or in combination, are utilized to achieve a prepolymer with low carboxyl content. The molar ratio between the dicarboxylic acid and the glycol may be altered such that the glycol is in excess of the molar ratio to achieve the prepolymerization by either the transesterification or the esterification reaction mechanism. Specifically, the molar ratio may be increased such that there may be initially 20-50% excess of the glycol in relation to the dicarboxylic acid with approximately 30% excess being preferred. Whenever terephthalic acid and ethylene glycol are used to produce the prepolymer, the molar ratio is, therefore, preferably approximately 1 mole of acid to 1.30 moles of glycol.

An alternative method to minimize the carboxyl end group content in the prepolymer is to add excess glycol during the stage in the melt process before a partial vacuum is begun in order to initiate the polycondensation, but after about 95% of the terephthalic acid is esterified. Specifically, the excess of glycol to be added at this later time constitutes from about 1% to about 20% excess of glycol in relation to the initial concentration of the glycol without regard to the initial glycol excess concentration conventional in the art. Preferably, excess from about 3% to about 10% is added at this later time. Whenever ethylene glycol is used, approximately 3 to 10% excess of the total glycol content in the reactor is added at this later partial vacuum stage.

Another alternative method to reduce and minimize the carboxyl content of the prepolymer is to delay the conventional addition of any polycondensation catalyst until a partial or full vacuum is reached in the reactor for the polycondensated step. Conventionally, catalysts are added before any vacuum is reached. Here the catalysts may be added between 20-60 minutes after the vacuum process is begun, whenever terephthalic acid is used. Accordingly, the catalysts are added before full vacuum is obtained. The polycondensation catalyst may be antimony trioxide, organotitanium, or any other condensation catalyst known to those skilled in the art. Because a low catalyst content is desired in the final product, and minimal catalyst is necessary for a solid state polymerization on a fluidized bed when the prepolymers contain a minimal carboxyl content, either of the first two alternative methods to obtain minimal carboxyl content in the prepolymers is desirable. However, any of these methods may be employed with any other method to achieve the objects of the invention. Preferably, the initial addition of excess polyhydric alcohol is preferred, either alone, or in combination with later introduction of excess polyhydric alcohol before the partial vacuum cycle of the melt process.

The melt process, as modified according to the objects of the invention, may be carried out under atmospheric or superatmospheric pressure with or without the use of a heel at temperatures between about 240° C. and about 290° C. The heel is prepolymer recycled to be used to increase the solubility of the dicarboxylic acid and thereby increase the reaction rate of the dicarboxylic acid and the polyhydric alcohol. The use of a heel is explained in U.S. Pat. No. 4,020,049.

Upon the esterification of 90 to 95% of the dicarboxylic acid, the melt process enters the partial vacuum stage wherein the atmospheric or superatmospheric pressure of the esterification stage is reduced to subatmospheric pressures, and a condensation reaction catalyst is added to the prepolymer to begin a partial polycondensation. The addition of the polycondensation catalyst, whether it be antimony trioxide, organotitanium, or any other polycondensation catalyst known to those skilled in the art, is subject to reduced concentrations and delayed addition, as described above. The polycondensation reaction continues after the pressure has reached a full vacuum or approximately less than 5.0 and preferably less than 1.0 millimeters of mercury, until the desired intrinsic viscosity of between 0.15 dl/g and 0.45 dl/g is reached. The desired polycondensation reaction temperature during the imposition of a partial and, later, a full vacuum is between about 260° and 290° C. and preferably between about 270° to 285° C. The prepolymer is then solidified, reduced to particulate form, and transferred to the solid state polymerization reactor to complete polycondensation reactions.

The prepolymer polyesters include polymers formed from dicarboxylic acids. The dicarboxylic acids may be an alkyl and contain a total of from 2 to 16 carbon atoms. Preferably, the acids are aryl or an alkyl substituted aryl containing from about 8 to about 16 carbon atoms. Specific examples of linear or alkyl dicarboxylic acids include oxalic acid, malonic acid, succinic acid, glutaric acid, adipic acid, pimelic acid, suberic acid, azelaic acid, sebacic acid, and the like. Specific examples of an aryl acid include the various isomers of phthalic acid, such as paraphthalic acid (terephthalic acid), and naphthalic acid. Specific examples of alkyl substituted aryl acids include the various isomers of dimethylphthalic acid, such as dimethylisophthalic acid, dimethylorthophthalic acid, dimethylterephthalic acid, the various isomers of diethylphthalic acid, such as diethylisophthalic acid, diethylorthophthalic acid, the various isomers of dimethylnaphthalic acid, such as 2,6-dimethylnaphthalic acid and 2,5-dimethylnaphthalic acid, and the various isomers of diethylnaphthalic acid.

Generally, dimethylterephthalic acid is preferred with terephthalic acid being highly preferred.

These dicarboxylic acid described above react in the esterification process with a glycol containing from 2 to 10 carbon atoms. The glycols may be straight-chained or branched. Specific examples include ethylene glycol, propylene glycol, trimethylene glycol, 1,4-butane diol, neopentyl glycol and the like. Of the various glycols, those having from 2 to 8 carbon atoms are preferred, with ethylene glycol and 1,4-butane diol being highly preferred.

When the prepolymerization reaction has been completed and the prepolymer has an intrinsic viscosity less than 0.45 dl/g, the prepolymer is divided and separated into prepolymer particles. Either spray-congealing or flaking-grinding process known to those skilled in various arts may be employed. The usable particle size is between 28 and 200 mesh. Desirably, the particles may pass through 35 mesh and be retained by 150 mesh. Preferably, the particles may pass through 80 mesh and be retained by 150 mesh. The mesh values are according to the Tyler Mesh Classification System.

The prepolymer particles are introduced into the fluidized bed solid state polymerization reactor. The prepolymer particles must be dried and crystallized for approximately thirty minutes to one hour at a temperature ranging from 140° C. to 160° C. This predrying and crystallizing conditioning of the prepolymer does not change either its intrinsic viscosity nor its carboxyl content. The predrying process uses preheated dry air or inert gases. The flow rate of the gas used should be preferably high enough to suspend the prepolymer particles. Desirably, the inert gas may be a high purity argon gas or helium gas and, preferably, may be a high purity nitrogen gas. The inert gas can be used for both the conditioning and solid state polymerization stages. However, the air can only be used for the conditioning stage.

After the conditioning of the prepolymer has been performed, the temperature of the nitrogen carrier gas is increased within the solid state polymerization chamber to a temperature between about 180° C. and 250° C. and, preferably, between about 200° C. and about 240° C. That temperature is maintained until the solid state polymerization in the fluidized bed is completed. The fluidized bed is created by the flow of the inert gas past the prepolymer particles, such that the particles are suspended above the bed of the reaction chamber. The flow rate of the inert gas for proper solid state polymerization is dependent upon the mesh size of the prepolymer particles. These fluidized bed reaction conditions permit the interreaction of the various end groups of the prepolymers within each particle such that a polycondensed polymer is produced with byproducts of water and a variety of glycols being released. The reaction byproducts readily diffuse to the surface of each particle and are carried away by the nitrogen gas. This removal of the byproduct promotes the forward reaction in the reaction mechanism, and it has been found that the various glycol byproducts are removed as rapidly as the water byproduct because of the small particle size and the gas flow rate.

The reaction rate of the solid state polymerization is dependent upon the polycondensation reaction within each particle and the diffusion of the byproduct from the interior of the particle to the surface of the particle, and from the surface of the particle into the carrier gas. With the small particle size and the fast gas flow rate inside the fluidized bed, the resistances to the diffusions of both reaction byproducts are negligible compared with the resistances to the chemical reactives. Thus the solid state polymerization in the fluidized bed is controlled by the reaction rate rather than the diffusion rate. It has been found that the transesterification reaction mechanism producing glycol as a byproduct proceeds at a faster reaction rate than the esterification reaction mechanism producing water as a byproduct. Because the transesterification reaction utilizes prepolymers having hydroxyalkyl end groups on both prepolymers, the need for prepolymers having carboxyl end groups is eliminated. Phrased in other words, the reaction rate for the polycondensation reaction in the solid state polymerization in a fluidized bed is maximized when the carboxyl content in the prepolymers is minimized. Thus, the production of a high molecular weight, high purity polyester is realized using a two-stage melt process-solid state polymerization on a fluidized bed system with prepolymers having minimal carboxyl content and requiring minimal concentrations of polycondensation catalyst. The production of such a polymer achieves the objects of the invention described above, by producing a polyester which has good stability and good color and clarity. The need for additives to the polycondensed polyester is minimized with this high molecular weight, high purity polyester.

Substantiation of the two-step process for the production of this improved polyester is found in the following examples.

EXAMPLE 1

A number of nominal 0.25 dl/g intrinsic viscosity polyethylene terephthalate prepolymers with varied catalyst levels and carboxyl numbers were prepared in a 25 pound reactor by the melt process described above. The carboxyl number is defined as the number of equivalents of carboxyl end groups per $10^6$ grams of polyester. The catalyst used in these experiments was antimony trioxide. The carboxyl number was controlled by varying the initial ratio of ethylene glycol and terephthalic acid and by the addition of excess ethylene glycol at the later stage described above, or by the delayed addition of the catalyst after the partial vacuum had been applied to the initial polycondensation step.

The prepolymers produced by this melt process were ground and classified, with particles passing through 28 Tyler mesh and retained on 35 Tyler mesh to be used for the solid state polymerization in the fluidized bed. The prepolymer particles of this mesh size were placed in a glass fluidized bed reactor of one inch internal diameter. High purity nitrogen gas was used to suspend the particles. The temperature of the fluidized bed and the nitrogen carrier gas was controlled by a dimethyl phthalate constant temperature bath.

The prepolymer particles were predried and crystallized for one hour with the bath at approximately 150° C. Then the bath temperature was raised to about 230° C. and maintained there until the intrinsic viscosity of the polycondensation product reached the desired level. The solid state polymerization continued for 7 to 50 hours, depending on the concentration of the polycondensation catalyst and the prepolymer carboxyl number.

The intrinsic viscosity and the carboxyl content of each of the polymers were closely followed throughout the solid state polymerization. The monitor of these two parameters are shown in Table I and FIG. 1. From Table I, it may be seen that the solid state reaction rate of the low intrinsic viscosity prepolymer generally increases with the increasing antimony level and decreasing prepolymer carboxyl number. However, the catalyst concentration is minimized without deleteriously affecting the polycondensation reaction rate. It is clear that polyethylene terephthalate with very low carboxyl numbers and low catalyst content can be produced by the fluidized bed solid state polymerization of low intrinsic viscosity prepolymer with low carboxyl numbers.

FIG. 1 produced by interpolation and extrapolation of the data listed in Table I shows that the carboxyl number of the prepolymer has significant effects on the fluidized bed solid state polymerization rate of the prepolymer. For example, if the initial carboxyl number of the polyethylene terephthalate prepolymer containing 100 ppm antimony is increased from 10, progressively through to 100 eq/$10^6$ grams, the reaction time required to polymerize by polycondensation from 0.25 to 0.70 intrinsic viscosity will be increased from 4, progressing through to 23 hours, respectively. It can be seen from this Figure, that in order to achieve the maximum solid state polymerization rate, prepolymers with low carboxyl numbers (i.e., lower than 10 eq/$10^6$ g at 0.25 IV) require no more than 100 ppm antimony while prepolymers with higher carboxyl numbers (i.e., higher than 40 eq/$10^6$ g at 0.25 IV) require more than 210 ppm antimony. Therefore, low carboxyl content not only maximizes the reaction rate but also reduces the required concentration of catalysts. This polymer product provides the desired stability and color clarity.

TABLE I

EXPERIMENTAL DATA FOR FLUIDIZED BED
SOLID STATE POLYMERIZATION OF LOW IV PET

Experiment Conditions
Particle Size = 28–35 mesh
Reaction temp = 230° C.
Nitrogen flow rate = 30 ft/min

| Run No | Catalyst Level ppm Sb | Carboxyl No. @0.25 IV eq/$10^6$g | % Carboxyl Ends at 0.25 IV | Reaction Time Required, hr 0.25–0.61V | Reaction Time Required, hr 0.25–0.71V | Carboxyl No. eq/$10^6$g @0.61V | Carboxyl No. eq/$10^6$g @0.71V |
|---|---|---|---|---|---|---|---|
| 1 | 0 | 13 | 3.3 | 23.4 | — | 3 | — |
| 2 | 0 | 72 | 18.5 | 31.0 | — | 16 | — |
| 3 | 0 | 130 | 33.4 | 38.0 | — | 32 | — |
| 4 | 20 | 12 | 3.1 | 6.3 | 11.5 | 6 | 5 |
| 5 | 20 | 35 | 9.0 | 11.5 | 20.2 | 17 | 15 |
| 6 | 20 | 58 | 14.9 | 13.7 | 24.6 | 26 | 22 |
| 7 | 20 | 94 | 24.2 | 18.4 | 35.9 | 40 | 31 |
| 8 | 100 | 7 | 1.8 | 2.4 | 3.4 | 4 | 3 |
| 9 | 100 | 39 | 10.0 | 5.3 | 9.8 | 22 | 18 |
| 10 | 100 | 70 | 18.0 | 7.4 | 14.0 | 39 | 33 |

TABLE I-continued
EXPERIMENTAL DATA FOR FLUIDIZED BED SOLID STATE POLYMERIZATION OF LOW IV PET Experiment Conditions:
Particle Size = 28-35 mesh
Reaction temp = 230° C.
Nitrogen flow rate = 30 ft/min

| Run No | Catalyst Level ppm Sb | Carboxyl No. @0.25 IV eq/$10^6$g | % Carboxyl Ends at 0.25 IV | Reaction Time Required, hr 0.25-0.61V | Reaction Time Required, hr 0.25-0.71V | Carboxyl No. eq/$10^6$g @0.61V | Carboxyl No. eq/$10^6$g @0.71V |
|---|---|---|---|---|---|---|---|
| 11 | 100 | 102 | 26.2 | 10.4 | 23.0 | 51 | 39 |
| 12 | 210 | 4 | 1.0 | 2.4 | 4.0 | 1 | 0 |
| 13 | 210 | 39 | 10.0 | 3.1 | 5.1 | 21 | 19 |
| 14 | 210 | 43 | 11.1 | 2.8 | 5.0 | 27 | 22 |
| 15 | 210 | 90 | 23.1 | 5.0 | 9.0* | 45 | 38* |
| 16 | 230 | 110 | 28.3 | 7.0 | 12.0* | 55 | 51* |

*Extrapolated Values

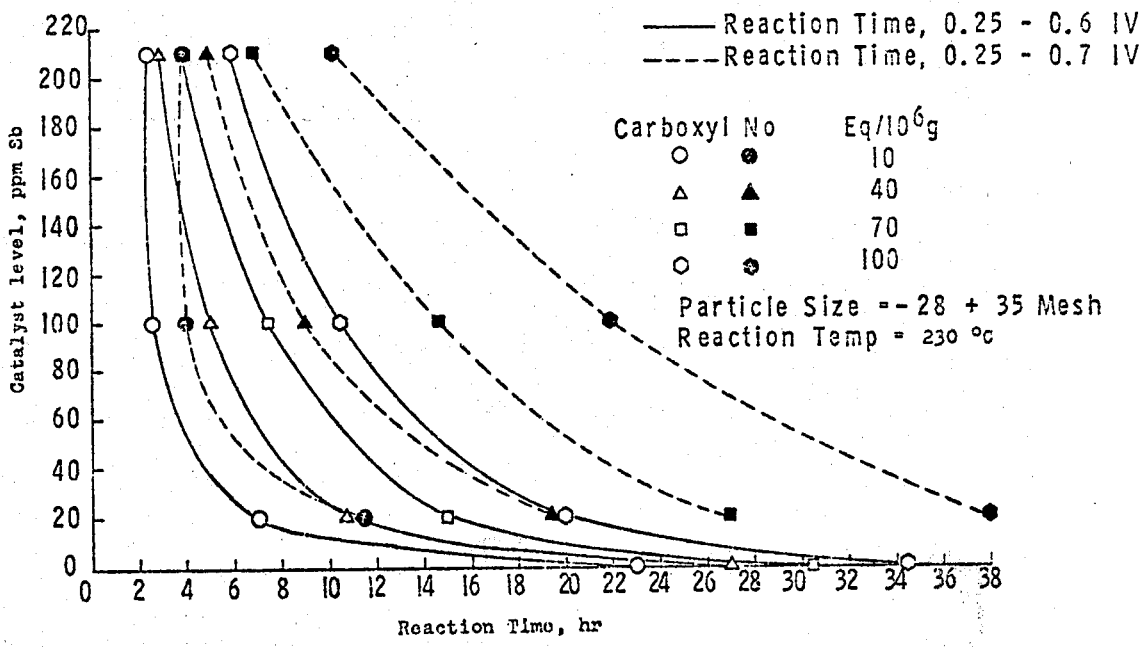

Figure 1

EFFECT OF CARBOXYL NUMBER ON FLUIDIZED BED SOLID STATE POLYMERIZATION OF 0.25 IV PET

EXAMPLE 2

Another series of polyethylene terephthalate prepolymers with a nominal intrinsic viscosity of 0.30 dl/g, and containing 100 ppm antimony (as $Sb_2O_3$) were prepared by a melt process, as stated in Example 1. The carboxyl numbers of this series of prepolymers ranged from 5 to 91 eq/$10^6$ g. The prepolymer powders obtained by grinding and classifying were subjected to the same fluidized bed solid state polymerization conditions as those in Example 1, except the particle size was between 80 mesh and 150 mesh, and the nitrogen flow rate was 15 ft/min.

The experimental results are shown in Table 2 and plotted therefrom on FIG. 2. The experimental data show the reaction time requirements in the fluidized bed solid state polymerization decrease with decreasing prepolymer carboxyl numbers. Expressed in other words, the reactivity of the prepolymers in the fluidized bed solid state polymerization increases with decreasing prepolymer carboxyl numbers. The prepolymer carboxyl number and the particle size permit a higher IV product to be produced, within acceptable economic requirements.

The alteration of the particle size of the prepolymer, and the increased intrinsic viscosity of the prepolymer, have significant and desirable properties, as expressed in Table 2, over those properties expressed in Table 1. Reduction of the particle size from the somewhat larger −20+30 mesh to −80+150 mesh on the Taylor scale provides greater surface area for the diffusion and removal of the reaction byproducts of the transesterification and the esterification reaction mechanism. Because the former reaction mechanism is preferred, according to reaction rates, the more efficient diffusion and removal of the transesterification reaction by-products of the transesterification and esterification reaction mechanisms. Because the former reaction mechanism is preferred, according to reaction rates, the more efficient diffusion and removal of the transesterification reaction byproducts is accomplished with a smaller particle size.

The increase in the intrinsic viscosity of the prepolymer from 0.25 dl/g to 0.30 dl/g reduces the reaction time requirements for the solid state polymerization because the prepolymer has a greater IV from which the desired IV may be more quickly obtained through the solid state polymerization.

Table 2 demonstrates the higher intrinsic viscosity obtainable which would not be economically feasible under the reaction conditions of Table 1. Specifically, a comparison of run 17 with run 8 indicates the reduced reaction time required and the ability to permit the polycondensation to reach 1.0 IV within acceptable time requirements.

FIG. 2 indicates diagrammatically the importance of the low carboxyl number in comparison with the final IV of the polycondensed product. The reaction time required to reach a 1.0 dl/g IV polycondensed product is within the requirements for economic feasibility only when the carboxyl number of the prepolymer is below 10 eq/$10^6$ g.

Both Example 1 and Example 2 demonstrate the economic feasibility of prepolymerization in a melt process and polycondensation in a fluidized bed, when the prepolymer polyester has a carboxyl end group content less than 20% of total end groups, producing a polycondensed polyester having the same or reduced percentage of carboxyl end group content. This may be seen by a comparison of the prepolymer carboxyl number and the polycondensed product carboxyl number.

TABLE 2

Catalyst level = 100 ppm Sb  Reaction Temperature = 230° C.
Particle Size = −80 + 150 mesh  Nitrogen Flow rate = 15 ft/min

| Run No. | Carboxyl No. at 0.3 IV eq/$10^6$g | % Carboxyl Ends at 0.3 IV | Reaction Time Required/hr. 0.3–0.6 IV | 0.3–0.7 IV | 0.3–1.0 IV | Carboxyl No. eg/$10^6$g at 0.6 IV | at 0.7 IV | at 1.0 IV |
|---|---|---|---|---|---|---|---|---|
| 17 | 5 | 1.7 | 0.8 | 0.9 | 3.3 | 4 | 3 | 2 |
| 18 | 8 | 2.7 | 0.8 | 1.0 | 3.8 | 7 | 6 | 4 |
| 19 | 19 | 6.4 | 1.2 | 2.0 | 8.0 | 16 | 14 | 11 |
| 20 | 35 | 11.8 | 1.7 | 3.0 | 13.6 | 30 | 26 | 19 |
| 21 | 50 | 16.8 | 2.2 | 4.4 | 23.6 | 42 | 37 | 28 |
| 22 | 53 | 17.8 | 2.4 | 5.2 | 27.4 | 40 | 36 | 27 |
| 23 | 91 | 30.6 | 5.6 | 11.4 | — | 60 | 52 | — |

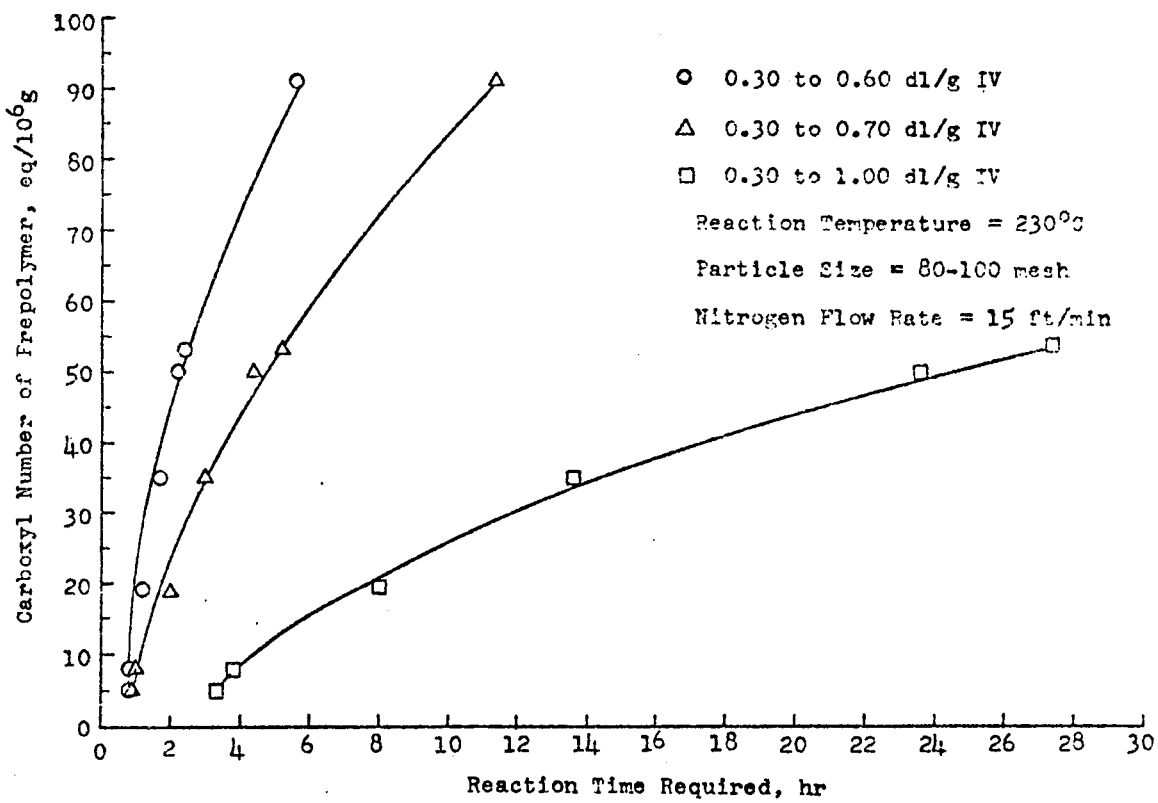

Figure 2

EFFECT OF CARBOXYL NUMBER ON FLUIDIZED BED SOLID STATE POLYMERIZATION OF 0.30 dl/g IV PET

Thus, it can be seen that the stability and color clarity of the polyester polymer is improved by a reaction process which utilizes a two-stage polymerization. To achieve the maximum rate for this polymerization, prepolymers having minimal carboxyl content, which requires minimal catalyst levelsn, are produced.

While in accordance with the patent statutes, a detailed description of the preferred embodiments and best mode have been set forth, the invention is not limited thereto or thereby. Consequently, for an understanding of the scope of the invention, reference is made to the following claims.

What is claimed is:

1. A method for the production of a high molecular weight, high purity polyester comprising the steps of
   (a) reacting a glycol and a dicarboxylic acid to form a polyester prepolymer, said polyester prepolymer having an intrinsic viscosity from about 0.15 dl/g to about 0.45 dl/g and having less than 20% carboxyl end group content,
   said dicarboxylic acids selected from the class consisting of alkyl dicarboxylic acids having a total of from 2 to 16 carbon atoms, and aryl dicarboxylic acids containing a total of from 8 to about 16 carbon atoms,
   said glycol selected from the class consisting of glycols having from 2 to 10 carbon atoms; and
   (b) polymerizing in a solid state in a fluidized bed, said polyester prepolymer so that a high molecular weight high purity polycondensed polyester is formed, said polycondensed polyester having an intrinsic viscosity at least 0.60 dl/g and having less than 20% carboxyl end group content.

2. A method according to claim 1, wherein a reaction catalyst is added during said prepolymerization reaction.

3. A method according to claim 2, wherein said catalyst is selected from the class consisting of antimony, titanium, iron, zinc, cobalt, lead, manganese, niobium, and germanium.

4. A method according to claim 3 wherein antimony is said catalyst and wherein no greater than 100 ppm of said antimony reaction catalyst is added to said prepolymerization reaction.

5. A method according to claim 3 wherein titanium is said catalyst and wherein no greater than 5 ppm of titanium is added to said prepolymerization reaction.

6. A method according to claim 2, wherein said prepolymerization reaction comprises a dicarboxylic esterification stage, a partial polycondensation vacuum stage, and a particle separation stage; and
   wherein said polymerization reaction comprises a drying stage and a solid state polymerization stage.

7. A method according to claim 6, wherein said dicarboxylic esterification stage has a reaction temperature from about 240° C. to about 290° C., has a reaction pressure of at least atmospheric pressures, and has a termination when from about 90% to about 95% of said dicarboxylic compound has been esterified by said glycol;
   wherein said partial polycondensation vacuum stage has a reaction temperature from about 260° C. to about 290° C., has a reaction pressure of at least subatmospheric pressures, and has a termination when said polyester prepolymer has an intrinsic viscosity from about 0.15 dl/g to about 0.45 dl/g;
   wherein said drying stage has a temperature from about 140° C. to about 160° C., has a duration from about 30 minutes to about one hour, and has a drying gas selected from the class consisting of air, argon gas, helium gas, nitrogen gas, and combinations thereof; and
   wherein said solid state polymerization stage has a temperature between about 180° C. and 250° C., has a duration until said polycondensed polyester intrinsic viscosity is at least 0.60 dl/g, and has a particle suspension gas at a flow rate sufficient to suspend particles of polyester prepolymer, said suspension gas selected from the class consisting of argon gas, helium gas, nitrogen gas, and combinations thereof.

8. A method according to claim 7, wherein said atmospheric pressures reach a pressure measuring less than 1.0 mm of mercury;
   wherein said reaction temperature is from about 270° C. to about 285° C.;
   wherein said drying gas is nitrogen gas; and
   wherein said solid state polymerization temperature is from about 200° C. to about 240° C., said suspension gas is nitrogen gas, and said flow rate is dependent upon particle size.

9. A method according to claim 6, wherein said particle separation stage divides said prepolymer polyester into particles having −20+200 Tyler mesh size.

10. A method according to claim 9, wherein said prepolymer particles have a −35+150 Tyler mesh size.

11. A method according to claim 10, wherein said prepolymer particles have a −80+150 Tyler mesh size.

12. A method according to claim 7, wherein said polyester prepolymer is formed by said reaction of 1.0 moles of dicarboxylic compound and from about 1.20 to about 1.50 moles of glycol, said reaction occurring during said dicarboxylic esterification stage.

13. A method according to claims 7, 8 or 11 wherein said polyester prepolymer is formed by said reaction of 1.0 moles of dicarboxylic compound and about 1.30 moles of said glycol, said reaction during said dicarboxylic esterification stage.

14. A method according to claims 7, 8 or 11 wherein said prepolymerization reaction further comprises the stage of reacting from about 1% to about 20% excess of said glycol with said polyester prepolymer after said dicarboxylic esterification stage and before said partial polycondensation vacuum stage.

15. A method according to claim 7, wherein said prepolymerization reaction further comprises the stage of reacting from about 3% to about 10% excess of said glycol with said polyester prepolymer after said dicarboxylic esterification stage and before said partial polycondensation vacuum stage.

16. A method according to claims 7, 8 or 11 wherein said prepolymerization reaction further comprises the stage of adding said reaction catalyst during said partial polycondensation vacuum stage.

17. A method according to claim 7, wherein said dicarboxylic acid is dimethylterephthalic acid and said glycol is 1,4-butane diol.

18. A method according to claim 13, wherein said dicarboxylic acid is terephthalic acid and said glycol is ethylene glycol.

19. A method according to claim 15, wherein said dicarboxylic acid is dimethylterephthalic acid and said glycol is ethylene glycol.

20. A method according to claim 16, wherein said dicarboxylic acid is dimethylterephthalic acid and said glycol is ethylene glycol.

21. A high molecular weight, high purity polyester, comprising:

a polycondensed polyester produced by a two-step polymerization, said polycondensed polyester having an intrinsic viscosity at least 0.60 dl/g and having less than 20% carboxyl end group content;

said two-step polymerization comprising a melt process and a solid-state polymerization in a fluidized bed;

said melt process forming a polyester prepolymer having an intrinsic viscosity from about 0.15 dl/g to about 0.45 dl/g, and having less than 20% carboxyl end group content;

said prepolymer polyester formed by a reaction of a glycol and a dicarboxylic acid;

said dicarboxylic acid selected from the class consisting of alkyl dicarboxylic acids having a total of from 2 to 16 carbon atoms, and aryl dicarboxylic acids containing a total of from about 8 to about 16 carbon atoms;

said glycol having from 2 to 10 carbon atoms; and said solid state polymerization forming said polycondensed polyester from said polyester prepolymer.

22. A high molecular weight, high purity polyester, according to claim 21, wherein a reaction catalyst is added during said melt process.

23. A high molecular weight, high purity polyester, according to claim 22 wherein said catalyst is selected from the class consisting of antimony, titanium, iron, zinc, cobalt, lead, manganese, niobium, and germanium.

24. A high molecular weight, high purity polyester, according to claim 23, wherein antimony is said catalyst and wherein no greater than 100 ppm of said antimony reaction catalyst is added to said melt process.

25. A high molecular weight, high purity polyester, according to claim 23, wherein titanium is said catalyst and wherein no greater than 5 ppm of titanium is added to said prepolymerization reaction.

26. A high molecular weight, high purity polyester, according to claim 22, wherein said melt process comprises a dicarboxylic esterification stage, a partial polycondensation vacuum stage, and a particle separation stage; and wherein said solid state polymerization comprises a drying stage and a solid state polymerization stage.

27. A high molecular weight, high purity polyester, according to claim 26, wherein said dicarboxylic esterification stage has a reaction temperature from about 240° C. to about 290° C., has a reaction pressure of at least atmospheric pressures, and has a termination when from about 90% to about 95% of said dicarboxylic compound has been esterified by said glycol;

wherein said partial polycondensation vacuum stage has a reaction temperature from about 260° C. to about 290° C., has a reaction pressure of at least subatmospheric pressures, and has a termination when said polyester prepolymer has an intrinsic viscosity from about 0.15 dl/g to about 0.45 dl/g;

wherein said drying stage has a temperature from about 140° C. to about 160° C., has a duration from about 30 minutes to about one hour, and has a drying gas selected from the class consisting of air, argon gas, helium gas, nitrogen gas, and combinations thereof; and wherein said solid state polymerization stage has a temperature between about 180° C. and 250° C., has a duration until said polycondensed polyester intrinsic viscosity is at least 0.60 dl/g, and has a particle suspension gas at a flow rate sufficient to suspend particles of said polyester prepolymer, said suspension gas selected from the class consisting of argon gas, helium gas, nittogen gas, and combinations thereof.

28. A high molecular weight, high purity polyester, according to claim 27, wherein said atmospheric pressures reach a pressure measuring less than 1.0 mm of mercury;

wherein said reaction temperature is from about 270° C. to about 285° C.;

wherein said drying gas is nitrogen gas; and wherein said solid state polymerization temperature is from about 200° C. to about 240° C., said suspension gas is nitrogen gas, and said flow rate is dependent upon particle size.

29. A high molecular weight, high purity polyester, according to claim 26, wherein said particle separation stage divides said polyester prepolymer into particles having −20+200 Tyler mesh size.

30. A high molecular weight, high purity polyester, according to claim 29, wherein said prepolymer particles have a −35+150 Tyler mesh size.

31. A high molecular weight, high purity polyester, according to claim 30, wherein said prepolymer particles have a −80+150 Tyler mesh size.

32. A high molecular weight, high purity polyester, according to claim 27, wherein said polyester prepolymer is formed by said reaction of 1.0 moles of dicarboxylic compound and from about 1.20 to about 1.50 moles of glycol, said reaction occurring during said dicarboxylic esterification stage.

33. A high molecular weight, high purity polyester, according to claims 27, 38 or 31, wherein said polyester prepolymer is formed by said reaction of 1.0 moles of dicarboxylic compound and about 1.30 moles of said glycol, said reaction occurring during said dicarboxylic esterification stage.

34. A high molecular weight, high purity polyester, according to claims 27, 38, or 31, wherein said prepolymerization reaction further comprises the stage of reacting from about 1% to about 20% excess of said glycol with said polyester prepolymer after said dicarboxylic esterification stage and before said partial polycondensation vacuum stage.

35. A high molecular weight, high purity polyester, according to claim 27, wherein said prepolymerization reaction further comprises the stage of reacting from about 3% to about 10% excess of said glycol with said polyester prepolymer after said dicarboxylic esterification stage and before said partial polycondensation vacuum stage.

36. A high molecular weight, high purity polyester, according to claims 27, 28, or 31, wherein said prepolymerization reaction further comprises the stage of adding said reaction catalyst during said partial polycondensation vacuum stage.

37. A high molecular weight, high purity polyester, according to claim 27, wherein said dicarboxylic acid is dimethylterephthalic acid and said glycol is 1,4-butane diol.

38. A high molecular weight, high purity polyester according to claim 33, wherein said dicarboxylic acid is terephthalic acid and said glycol is ethylene glycol.

39. A high molecular weight, high purity polyester, according to claim 35, wherein said dicarboxylic acid is terephthalic acid and said glycol is ethylene glycol.

40. A high molecular weight, high purity polyester, according to claim 36, wherein said dicarboxylic acid is terephthalic acid, and said glycol is ethylene glycol.

41. A polyester having color clarity and stability, comprising:
- a polycondensed polyester having an intrinsic viscosity at least 0.60 dl/g and having less than 20% carboxyl end group content;
- said polycondensed polyester formed having a reaction catalyst impurity contained therein, said reaction catalyst selected from the class consisting of antimony and titanium; and
- said antimony impurity being less than 100 ppm and said titanium impurity being less than 5 ppm.

42. A polyester having color clarity and stability, according to claim 41, wherein said polycondensed polyester is a reaction product of a glycol and a dicarboxylic acid, said dicarboxylic acid selected from the class consisting of alkyl dicarboxylic acids having a total of from about 2 to 16 carbon atoms, and aryl dicarboxylic acid containing a total of from 8 to about 16 carbon atoms; and
- said glycol selected from the class consisting of glycols having from 2 to 10 carbon atoms.

43. A polyester having color clarity and stability, according to claim 42, wherein said dicarboxylic acid is dimethylterephthalic acid and said glycol is 1,4-butane diol.

44. A polyester having color clarity and stability, according to claim 42, wherein said dicarboxylic acid is terephthalic acid and said glycol is ethylene glycol.

* * * * *